(12) United States Patent
Chono et al.

(10) Patent No.: US 7,324,182 B2
(45) Date of Patent: Jan. 29, 2008

(54) OBJECT ROTATING MECHANISM USING LIQUID CRYSTAL FLOW

(75) Inventors: Shigeomi Chono, Nankoku (JP); Tomohiro Tsuji, Kami-gun (JP)

(73) Assignee: Kochi University of Technology, Kochi (JP)

( * ) Notice: Subject to any disclaimer, the term of this patent is extended or adjusted under 35 U.S.C. 154(b) by 37 days.

(21) Appl. No.: 10/550,566

(22) PCT Filed: Mar. 31, 2003

(86) PCT No.: PCT/JP03/04141

§ 371 (c)(1),
(2), (4) Date: Jun. 26, 2006

(87) PCT Pub. No.: WO2004/087562

PCT Pub. Date: Oct. 14, 2004

(65) Prior Publication Data

US 2006/0238686 A1    Oct. 26, 2006

(51) Int. Cl.
*G02F 1/1337* (2006.01)

(52) U.S. Cl. .......................... 349/126; 349/1; 349/128; 349/89

(58) Field of Classification Search ............... 349/1, 349/110, 128, 129, 86, 88, 89, 92, 93, 94, 349/124, 126, 136

See application file for complete search history.

(56) References Cited

U.S. PATENT DOCUMENTS 5,579,141 A * 11/1996 Suzuki et al. ............... 349/124
5,710,609 A * 1/1998 Shimada ..................... 349/126
5,739,885 A * 4/1998 Mochizuki et al. .......... 349/135
5,831,701 A * 11/1998 Matsuyama et al. ........ 349/110
5,867,237 A * 2/1999 Yazaki et al. ................. 349/86
2006/0238686 A1* 10/2006 Chono et al. ............... 349/126

FOREIGN PATENT DOCUMENTS

| JP | 06-294374 | 10/1994 | ................. 349/1 X |
| JP | 11-223178 | 8/1999 | ................. 349/1 X |
| JP | 11-230023 | 8/1999 | ................. 349/1 X |
| JP | 2000-201489 | 7/2000 | ................. 349/1 X |
| JP | 2001-013895 | 1/2001 | ................. 349/1 X |
| JP | 2001-260097 | 9/2001 | ................. 349/1 X |
| JP | 2001-260100 | 9/2001 | ................. 349/1 X |

* cited by examiner

*Primary Examiner*—Brian M. Healy
(74) *Attorney, Agent, or Firm*—Beyer Weaver LLP (57) ABSTRACT

In a rotating mechanism including a pair of members 11 and 11 having opposed surfaces B which are opposed to each other and provided to be relatively movable in a state in which the opposed surfaces B are opposed to each other, a liquid crystal LC provided between the opposed surfaces B and B of the members 11 and 11, and liquid crystal molecule rotating means for rotating a liquid crystal molecule m of the liquid crystal LC in a crossing surface crossing one of the opposed surfaces B and B, the liquid crystal molecule rotating means includes a pair of orientation films 12 and 12 formed on the opposed surfaces B and B, and the orientation films 12 and 12 are subjected to a rubbing treatment in which directions of a rotation around an identical crossing line crossing the members 11 and 11 are reverse to each other along a circumference of a circle having a center on the crossing line.

6 Claims, 8 Drawing Sheets

//OBJECT ROTATING MECHANISM USING LIQUID CRYSTAL FLOW

This application is a 371 of International Application No. PCT/JP2003/004141, filed Mar. 31, 2003.

TECHNICAL FIELD

The present invention relates to an object rotating mechanism using the flow of a liquid crystal. The liquid crystal implies a state having a fluidity and an optical anisotropy and causes birefringence, and having crystal-like properties or a substance set in such a state. When an electric field or a magnetic field is applied to the liquid crystal, all molecules of the liquid crystal are rotated in the same direction around the center of gravity and an axial direction thereof is oriented at a peculiar angle to the liquid crystal with respect to the direction of the electric field or the magnetic field. The present invention relates to an object rotating mechanism using the flow of the liquid crystal utilizing the properties of the liquid crystal.

BACKGROUND ART

Conventionally, the optical property of the liquid crystal are changed by the orientation of the molecule of the liquid crystal. By utilizing this property, therefore, the liquid crystal has been used in an information display device such as a liquid crystal display.

When an electric field or a magnetic field is applied to change the direction of orientation of the molecule of the liquid crystal, moreover, the viscosity of the liquid crystal itself is changed, that is, the liquid crystal also has the property of an electro-rhological fluid. For this reason, there has been developed a bearing, a damper and the like which utilize the property of the electro-rhological fluid.

On the other hand, it has been known that the flow of the liquid crystal is generated when the electric field or the magnetic field is applied to the liquid crystal. Techniques described in Patent Documents 1 to 3 have been disclosed as a technology which industrially utilizes the flow of a liquid crystal. Each of these techniques has been developed based on a theory that a convection is generated around a parallel axis with a parallel plate when a perpendicular electric field or magnetic field to the parallel plate is applied to a liquid crystal provided between a pair of parallel plates. In other words, the flow of the liquid crystal has been developed on the premise that the molecule of the liquid crystal is also moved in a perpendicular direction to the parallel plate, that is, a parallel direction with the direction of the electric field or magnetic field.

Patent Document 1

Japanese Laid-Open Patent Publication No. 2001-260100

Patent Document 2

Japanese Laid-Open Patent Publication No. 2001-13895

Patent Document 3

Japanese Laid-Open Patent Publication No. 2001-260100

Thus, the inventors of the present invention made studies vigorously and repetitively. As a result, it has been found that the flow of a liquid crystal is caused by a speed gradient generated through the rotation of the molecule of the liquid crystal, and the molecule of the liquid crystal is moved in a perpendicular direction to the direction of an electric field or a magnetic field but is not moved in the direction of the electric field or the magnetic field when the flow of the liquid crystal is generated. Based on this principle, a mechanism for industrially utilizing the flow of the liquid crystal has been invented.

In consideration of the circumstances, it is an object of the present invention to provide an object rotating mechanism capable of industrially utilizing the flow of a liquid crystal.

DISCLOSURE OF THE INVENTION

An object rotating mechanism using a flow of a liquid crystal according to a first aspect of the present invention, comprises a pair of members having opposed surfaces which are opposed to each other and provided to be relatively movable in a state in which the opposed surfaces are opposed to each other, a liquid crystal provided between the opposed surfaces of the members, and liquid crystal molecule rotating means for rotating a liquid crystal molecule of the liquid crystal in a crossing surface crossing one of the opposed surfaces, wherein the liquid crystal molecule rotating means includes a pair of orientation films formed on the opposed surfaces of the members respectively, and the orientation films are subjected to a rubbing treatment in which directions of a rotation around an identical crossing line crossing the members are reverse to each other along a circumference of a circle having a center on the crossing line.

According to the first aspect of the present invention, when the molecule of the liquid crystal is rotated in the surface crossing the opposed surface of one of the members by the liquid crystal molecule rotating means, the flow of a liquid crystal can be generated along the opposed surface between the opposed surfaces of the members. Consequently, the members can be moved each other in a state in which the opposed surfaces are opposed to each other. If one of the members is fixed, therefore, the other member can be moved in the direction of the flow of the liquid crystal. In addition, the orientation films formed on the opposed surfaces of the members are subjected to the rubbing treatment in which the rotating directions around the crossing line are reverse to each other. Therefore, the flow of the liquid crystal to be rotated around the crossing line is generated between the orientation films, that is, the members. If one of the members is fixed, accordingly, the other member can be rotated around the crossing line. Consequently, the flow of the liquid crystal generated between the members can be utilized for the rotating movement of the members. Thus, the flow of the liquid crystal can be applied to a delivery device and a turntable which utilizes the liquid crystal.

An object rotating mechanism using a flow of a liquid crystal according to a second aspect of the present invention, comprises a pair of members having opposed surfaces which are opposed to each other, a liquid crystal provided between the opposed surfaces of the members, liquid crystal molecule rotating means for rotating a liquid crystal molecule of the liquid crystal in a crossing surface crossing one of the opposed surfaces, and a moving member having a pair of moving side opposed surfaces which are opposed to the opposed surfaces of the members respectively and provided to be relatively movable with respect to the members in a state in which the moving side opposed surfaces are opposed to the opposed surfaces of the members, wherein the liquid crystal molecule rotating means includes a pair of orientation films formed on the opposed surfaces of the members respectively and a pair of moving side orientation films formed on the moving side opposed surfaces of the moving member respectively, the orientation films are subjected to a rubbing treatment in which directions of a rotation around an identical crossing line crossing the members and the moving member are the same along a circumference of a circle having a center on the crossing line, and the moving side orientation films are subjected to the rubbing treatment in which the direction of the rotation around the crossing line is reverse to the opposed orientation films along the circumference of the circle having the center on the crossing line.

According to the second aspect of the present invention, if the molecule of the liquid crystal is rotated in the surface crossing the opposed surface of one of the members by the liquid crystal molecule rotating means, the flow of the liquid crystal along the opposed surfaces and the moving side opposed surfaces can be generated between the opposed surfaces of the members and the moving side opposed surfaces. In addition, the orientation films of the opposed surfaces and the moving side orientation films of the moving side opposed surfaces are subjected to the rubbing treatment in which the directions of a rotation around the crossing line are reverse to each other. Therefore, the flow of the liquid crystal to be rotated in the same direction around the crossing line with the crossing line set to be a center is generated between the opposed orientation films and the moving side orientation films, that is, between one of the members and the moving member and between the other member and the moving member. The moving member and the pair of members can be moved each other in a state in which the opposed surfaces and the moving side opposed surfaces are opposed to each other. If the members are fixed, therefore, the moving member can be rotated around the crossing line. To the contrary, if the moving member is fixed, the members can be rotated around the crossing line. Consequently, the flow of the liquid crystal which is generated between the members can be utilized for the rotating movement of the members and the moving member. Thus, the flow of the liquid crystal can be applied to a delivery device and a turntable which utilize the liquid crystal.

In the second aspect of the present invention, an object rotating mechanism using a flow of a liquid crystal according to a third aspect of the present invention is characterized in that the rotating mechanism includes an output shaft which is coaxial with the crossing line.

According to the third aspect of the present invention, if the moving member of the rotating mechanism is rotated, the output shaft is rotated around an axis thereof. Therefore, the energy of the rotating motion of the moving member can be taken out as the rotating torque of the output shaft. Accordingly, it is possible to easily take out the kinetic energy generated by the rotating mechanism.

In the second aspect of the present invention, an object rotating mechanism using a flow of a liquid crystal according to a fourth aspect of the present invention is characterized in that the rotating mechanism is provided in a plurality of stages, each of the rotating mechanism is provided in such a manner that a crossing line thereof is positioned on an identical line, and an output shaft to which the moving member of the rotating mechanism is attached is provided coaxially with the crossing line.

According to the fourth aspect of the present invention, the kinetic energy generated from the rotating mechanisms can be taken out of one rotating shaft. Therefore, it is possible to increase the rotating torque generated on the output shaft.

In the first or second aspect of the present invention, an object rotating mechanism using a flow of a liquid crystal according to a fifth aspect of the present invention is characterized in that the liquid crystal molecule rotating means is provided with an orienting device for applying an electric field or a magnetic field to the liquid crystal.

According to the fifth aspect of the present invention, if the electric field or the magnetic field is applied by the orienting device, the molecule of the liquid crystal has an axial direction oriented at a peculiar angle to the liquid crystal with respect to the direction of the electric field or the magnetic field. When the molecule of the liquid crystal is to be oriented, it is rotated around a center of gravity thereof. Consequently, it is possible to generate the flow of the liquid crystal by the rotation of the molecule of the liquid crystal.

In the fifth aspect of the present invention, an object rotating mechanism using a flow of a liquid crystal according to a sixth aspect of the present invention is characterized in that the liquid crystal molecule rotating means includes a control device for controlling a timing in which the orienting device applies an electric field or a magnetic field to the liquid crystal, and the control device intermittently applies the electric field or the magnetic field to the liquid crystal.

According to the sixth aspect of the present invention, when the electric field or the magnetic field is applied intermittently by the orienting device, the intermittent flow of the liquid crystal can be generated in a constant direction. If a time interval at which the electric field or the magnetic field is applied or the magnitude of the electric field or the magnetic field is changed, moreover, the flow rate of the flow of the liquid crystal can be changed. If the time interval at which the electric field or the magnetic field is applied is shortened, furthermore, the flow of the liquid crystal can be caused to approach a more continuous flow.

BRIEF DESCRIPTION OF THE DRAWINGS

In FIG. 3, (A) is an explanatory view showing the movement of a liquid crystal molecule m which is generated when an electric field is applied between a pair of members 11 and 11 and (B) is a view showing the speed distribution of the flow of a liquid crystal which is generated between the members 11 and 11.

In FIG. 4, (A) and (B) are explanatory views showing the movement of the liquid crystal molecule m which is generated when the electric field is applied and (C) is a view showing a speed gradient generated by the rotation of the liquid crystal molecule m.

In FIG. 5, (A) and (B) are explanatory views showing the movement of the liquid crystal molecule m which is generated when an electric field is applied to a liquid crystal LC mounted on a parallel plate 11, (C) is a view showing a speed gradient which is generated by the rotation of the liquid crystal molecule m, and (D) is a view showing the speed distribution of the flow of a liquid crystal.

BEST MODE FOR CARRYING OUT THE INVENTION

Before the explanation of an object rotating mechanism using the flow of a liquid crystal according to the present invention, first of all, description will be given to a principle for generating the flow of the liquid crystal when an electric field or a magnetic field is applied to the liquid crystal.

In the liquid crystal, the axial direction of a liquid crystal molecule is oriented at a peculiar angle to the liquid crystal with respect to the direction of an electric field or a magnetic field when the electric field or the magnetic field is applied. Description will be given to a liquid crystal in which the axial direction of the liquid crystal molecule is parallel with the direction of the electric field or the magnetic field when the electric field or the magnetic field is applied.

Moreover, the liquid crystal molecule is oriented also when the electric field or the magnetic field is applied. For this reason, description will be given to only the case in which the electric field is applied.

Figure 4:
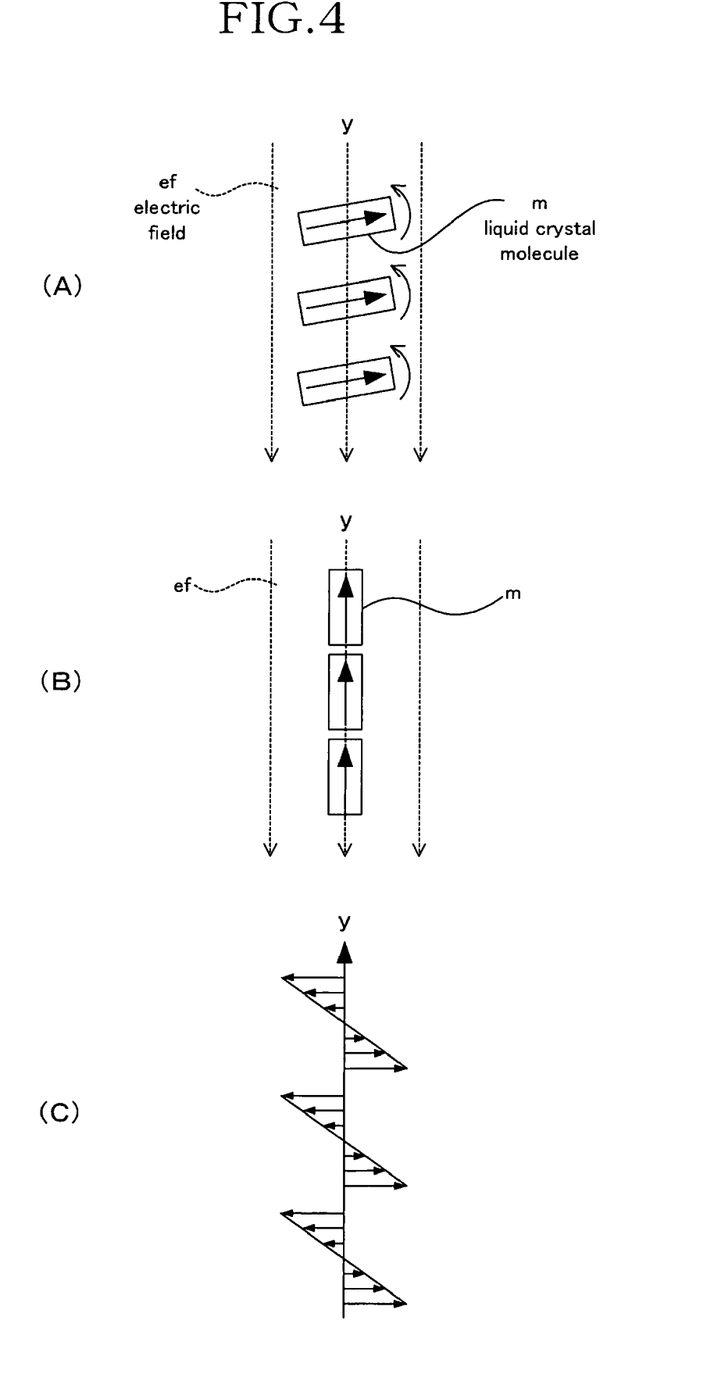
Figure 5:
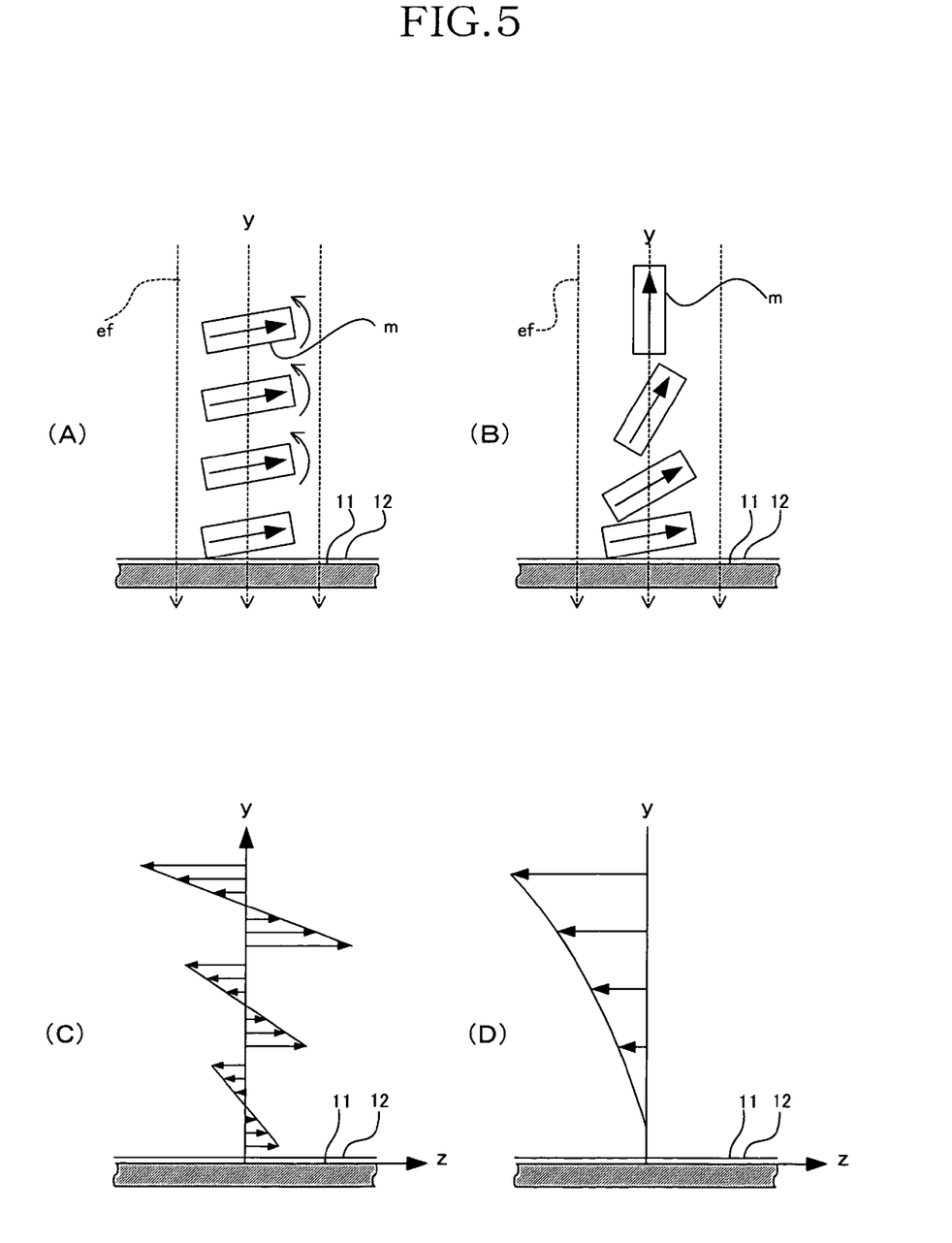

In FIG. 4, (A) and (B) are explanatory views showing the movement of the liquid crystal molecule m which is generated when the electric field is applied and (C) is a view showing a speed gradient generated by the rotation of the liquid crystal molecule m. In FIG. 5, (A) and (B) are explanatory views showing the movement of the liquid crystal molecule m which is generated when an electric field is applied to a liquid crystal LC mounted on a parallel plate 11, (C) is an explanatory view showing a speed gradient which is generated by the rotation of the liquid crystal molecule m, and (D) is an explanatory view showing the speed distribution of the flow of a liquid crystal. As shown in FIG. 4, when an electric field ef is applied to the liquid crystal LC in order to cross the axial direction of the liquid crystal molecule m, the liquid crystal molecule m is rotated in such a direction that a rotating angle thereof is decreased (a direction of an arrow in FIG. 4(A)) until the axial direction is coincident with the electric field ef (FIG. 4(B)). Consequently, a speed gradient is generated around each liquid crystal molecule m so that the flow of the liquid crystal is generated (FIG. 4(C)).

In FIG. 5(A), the reference numeral 12 denotes an orientation film provided the parallel plate 11. The material of the orientation film 12 is a polymer substance such as polyimide. When a part of the liquid crystal LC is caused to come in contact with the orientation film 12 of the parallel plate 11, the liquid crystal molecule m in the vicinity of the parallel plate 11 is restrained by the orientation film 12 of the parallel plate 11 (which will be hereinafter referred to as anchoring). Even if the electric field ef is applied, consequently, the liquid crystal molecule m positioned in the vicinity of the parallel plate 11 cannot be rotated until the axial direction is coincident with the electric field ef so that the amount of the rotation is reduced (FIG. 5(B)). In addition, the amount of the rotation of the liquid crystal molecule m is smaller when the parallel plate 11 is closer, and it is zero on the parallel plate 11. Therefore, the speed gradient formed around the liquid crystal molecule m by the rotation of the liquid crystal molecule m is also smaller when the parallel plate 11 is closer (FIG. 5(C)).

If the movement of a part of the liquid crystal molecules m is anchored by the orientation film 12 of the parallel plate 11 in the liquid crystal LC, accordingly, the flow of the liquid crystal molecule m having the speed distribution shown in FIG. 5(D) is generated in the liquid crystal LC.

Description will be given to the object rotating mechanism using the flow of a liquid crystal according to the present invention.

Figures 1, 1A, 1B:
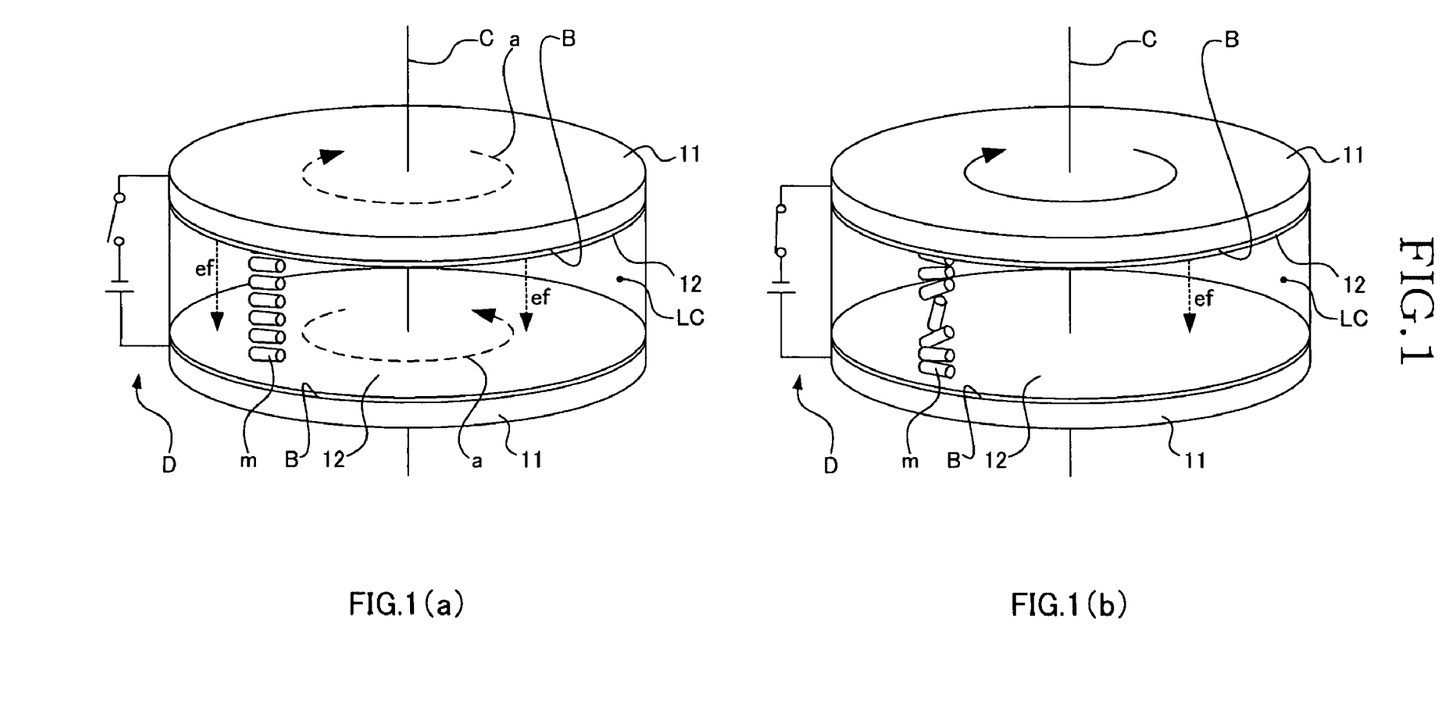
FIG. 1 is a schematic explanatory view showing an object rotating mechanism utilizing the flow of a liquid crystal according to a first embodiment.
Figure 2:
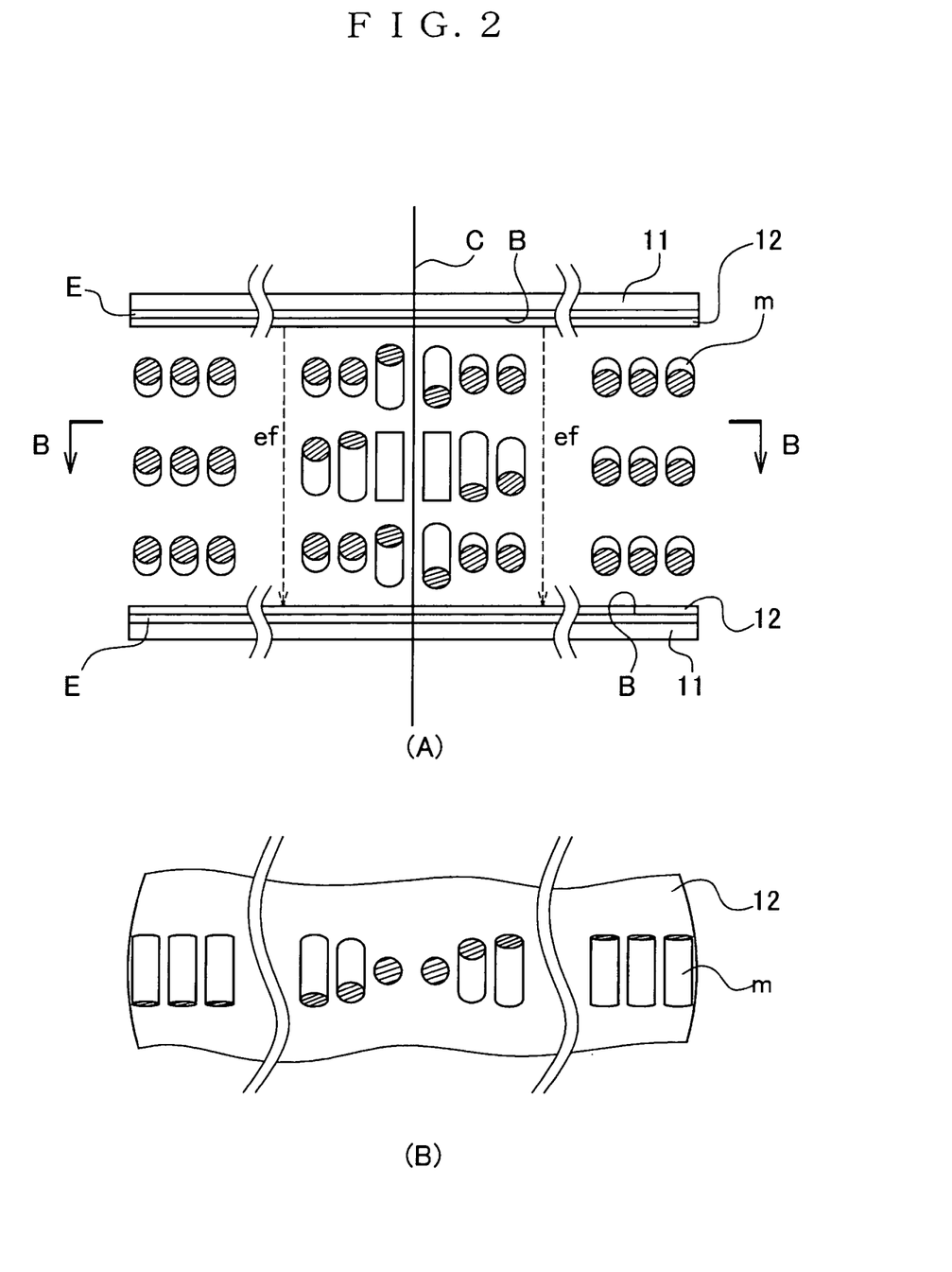
FIG. 2 is a schematic sectional view showing the object rotating mechanism according to the first embodiment, (A) being a longitudinal sectional view including a central axis C and (B) being a sectional view taken along a line B-B in (A).
Figure 3:
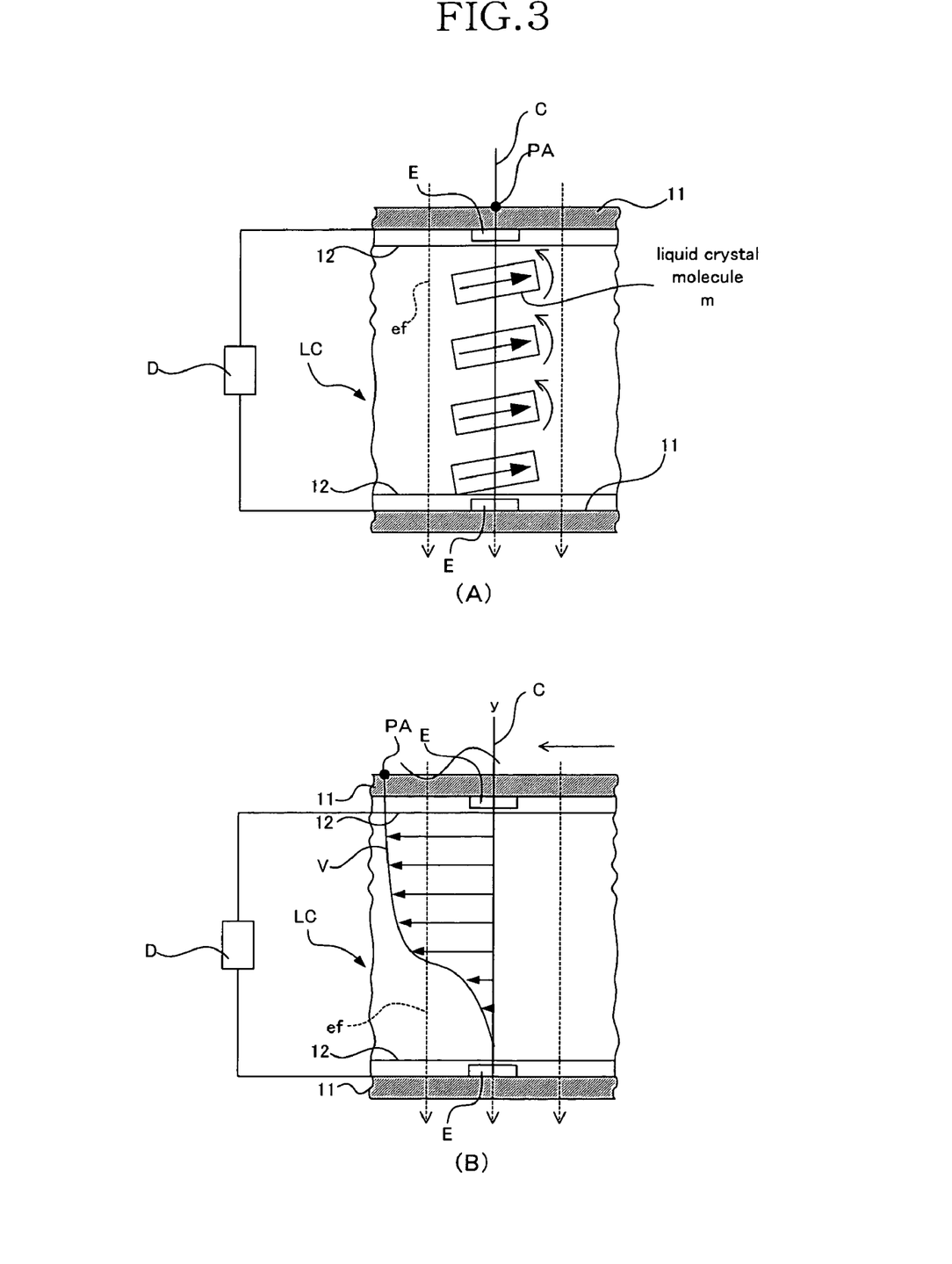

FIG. 1 is a schematic explanatory view showing an object rotating mechanism utilizing the flow of a liquid crystal according to a first embodiment. FIG. 2 is a schematic sectional view showing the object rotating mechanism according to the first embodiment, (A) being a longitudinal sectional view including a central axis C and (B) being a sectional view taken along a line B-B in (A). In FIG. 3, (A) is an explanatory view showing the movement of a liquid crystal molecule m which is generated when an electric field is applied between a pair of members 11 and 11 and (B) is a view showing the speed distribution of the flow of a liquid crystal which is generated between the members 11 and 11.

In FIGS. 1 and 2, the reference numeral 11 denotes a pair of members 11 and 11. The members 11 and 11 include a pair of opposed surfaces B and B which are opposed to each other. The opposed surfaces B and B are parallel with each other and both of the opposed surfaces B are formed to be flat surfaces. The members 11 and 11 are provided to be relatively movable in a state in which the opposed surfaces B and B are opposed to each other. More specifically, when the lower member 11 is fixed, the upper member 11 can be rotated with respect to the lower member 11 or can be moved longitudinally and laterally with the opposed surfaces B and B held in parallel.

The opposed surfaces B and B which are opposed to each other do not need to be parallel with each other but one of the opposed surfaces B may be inclined to the other opposed surface B.

Furthermore, each of the opposed surfaces B does not need to be the flat surface. For example, one of the opposed surfaces B may be the flat surface and the other opposed surface B may have concavo-convex portions or both of the opposed surfaces B may have the concavo-convex portions.

The liquid crystal LC is put between the opposed surfaces B and B of the members 11 and 11. The liquid crystal LC is a nematic liquid crystal, a smectic liquid crystal, a cholesteric liquid crystal, a discotic liquid crystal or the like, for example, and there is no particular restriction to a liquid crystal having the liquid crystal molecule m to be rotated when an electric field is applied.

A pair of orientation films 12 and 12 are provided between the liquid crystal LC and the opposed surfaces B and B, respectively. The materials of the orientation films 12 and 12 are polymer substances such as polyimide.

Both of the opposed surfaces of the orientation films 12 and 12 are subjected to a rubbing treatment. Therefore, the liquid crystal molecule m in the liquid crystal LC which comes in contact with the orientation films 12 and 12 is anchored to the orientation films 12 and 12. Consequently, the liquid crystal molecule m to come in contact with each of the orientation films 12 is arranged with the axial direction turned in a rubbing direction and is arranged (which will be hereinafter referred to as "tilt") in such a manner that an end on a downstream side in the rubbing separates from the orientation film 12 (see FIG. 3(A)).

In the object rotating mechanism according to the first embodiment, the orientation films 12 and 12 are subjected to the rubbing treatment in the opposed surfaces along a circle having a center on an identical crossing line C which crosses the members 11 and 11. In addition, a direction a of the rubbing treatment is set to be counterclockwise seen from above in the axial direction of the crossing line C in the lower orientation film 12 and is set to be clockwise seen from above in the axial direction of the crossing line C in the upper orientation film 12. In other words, the rubbing treatment is carried out over the upper orientation film 12 in such a manner that the directions of a rotation around the crossing line C are reverse to each other with respect to the direction of the rubbing treatment carried out over the lower orientation film 12.

In the liquid crystal LC between the members 11 and 11, consequently, all of the liquid crystal molecules m between the orientation films 12 and 12 are arranged in an upward inclination state to the lower orientation film 12 in order to have the axial direction turned in the direction of the tangent of a circle around the crossing line C.

As shown in FIG. 2, the liquid crystal molecule m is oriented in such a manner that an upper inclination to the orientation film 12 suddenly becomes greater than that of the liquid crystal molecule m in a position placed apart from the crossing line C in a radial direction in the vicinity of the crossing line C. Therefore, the continuity of the orientation of the liquid crystal molecule m in the vicinity of the crossing line C is maintained. This principle has been clarified by the inventors. The members 11 and 11 can be rotated relatively based on this principle and the reason will be described below.

The orientation film 12 does not need to be provided between the liquid crystal LC and the opposed surfaces B and B and it is preferable to carry out a rubbingless treatment over the opposed surfaces B and B of the members 11 and 11.

Moreover, a pair of electrodes E and E are provided between the opposed surfaces B and B and the orientation films 12 and 12 respectively (see FIG. 2(A)). The electrodes E and E are provided in such a manner that a line connecting both of them is perpendicular to the opposed surfaces B and B. Moreover, the electrodes E and E are connected to a control device D having a power supply.

When a voltage is applied to the electrodes E and E by the control device D, therefore, it is possible to form the electric field ef which is perpendicular to the opposed surfaces B and B between the opposed surfaces B and B. The electrodes E and E represent an orienting device in claims and the orientation films 12 and 12, the electrodes E and E and the control device D constitute liquid crystal molecule rotating means in claims.

The electrodes E and E do not need to be provided in such a manner that the line connecting both of them is perpendicular to the opposed surfaces B and B but are preferably provided in such a manner that the liquid crystal molecule m of the liquid crystal LC is rotated in a surface crossing one of the opposed surfaces B by the electric field ef formed on the electrodes E and E.

The electrodes E and E may be attached to the external surfaces of the members 11 and 11. In this case, if the members 11 and 11 are formed by an electric conductor or a material through which an electric field can be transmitted, the electric field ef can be formed between the opposed surfaces B and B.

In the case in which the material of the members 11 and 11 is the electric conductor, it is possible to generate the electric field ef between the opposed surfaces B and B by applying a voltage to the members 11 and 11 through the control device D if the control device D is directly connected to the members 11 and 11.

Next, description will be given to the functions and effects of the object rotating mechanism according to the first embodiment.

First of all, when a voltage is applied between the electrodes E and E by the control device D in a state in which the lower one of the members 11 and 11 is fixed, the electric field ef is generated in a perpendicular direction to the opposed surfaces B and B between the opposed surfaces B and B. Consequently, the liquid crystal molecule m of the liquid crystal LC is rotated in such a direction that the axial direction is parallel with the electric field ef (FIG. 3(A)). Thus, a speed gradient is generated around the liquid crystal molecule m by the rotation thereof. The speed gradient is more increased apart from the orientation film 12 (see FIG. 5(c)). Thus, the speed gradient generated by the liquid crystal molecule m is integrated so that the flow of the liquid crystal having the speed distribution shown in FIG. 3(B) is generated on the liquid crystal LC between the opposed surfaces B and B in a reverse direction to a direction in which the liquid crystal molecule m is inclined upward.

When the electric field ef is applied, it is a matter of course that the liquid crystal molecule m in the vicinity of the crossing line C is also rotated. When the speed gradient generated by the rotation of the liquid crystal molecule m is increased, the flow of the liquid crystal having a great relative speed difference in reverse directions to each other is generated on both sides interposing the crossing line C therebetween. Consequently, it is impossible to maintain the continuity of the flow of the liquid crystal in the vicinity of the crossing line C. According to the principle clarified by the inventor described above, however, the upper inclination of the liquid crystal molecule m to the orientation film 12 in the vicinity of the crossing line C is increased, and the speed gradient generated on the liquid crystal molecule m in the vicinity of the crossing line C is very small. When the liquid crystal molecule m is arranged in such a direction as to be turned toward the electric field ef in the vicinity of the crossing line C, moreover, the speed gradient is not generated even if the electric field ef is applied. Consequently, the flow of the liquid crystal can be prevented from being discontinuous in the vicinity of the crossing line C.

Accordingly, the flow of the liquid crystal which is rotated around the crossing line C and is continuous also in the portion of the crossing line C is generated between the opposed surfaces B and B. Therefore, the upper member 11 is rotated clockwise around the crossing line C as seen from above in the axial direction of the crossing line C with respect to the lower member 11 (FIG. 1(B)).

When the application of the voltage between the electrodes E and E is stopped, subsequently, the liquid crystal molecule m is returned into a state brought before the application of the voltage. At this time, the liquid crystal molecule m is rotated in a reverse direction to a direction in the case in which the voltage is applied between the electrodes E and E. Therefore, the speed gradient in the direction in which the liquid crystal molecule m is inclined upward is generated. Accordingly, a speed distribution in a reverse direction to the speed distribution shown in FIG. 5(B) is formed on the liquid crystal LC between the opposed surfaces B and B and the upper member 11 is rotated counterclockwise around the crossing line C as seen from above in the axial direction of the crossing line C with respect to the lower member 11.

However, the rotating speed of the rotation of the liquid crystal molecule m generated when the application of the voltage is stopped is lower than the rotating speed of the liquid crystal molecule m which is generated when the voltage is applied. For this reason, the speed gradient generated when the application of the voltage is stopped is smaller than that of the liquid crystal molecule m which is generated when the voltage is applied. Accordingly, the amount of the counterclockwise rotation of the upper member 11 in the stoppage of the application of the voltage is smaller than the amount of the clockwise rotation in the application of the voltage.

When the voltage is applied instantaneously between the electrodes E and E, therefore, a rotating movement is generated on the upper member 11 clockwise, that is, in the same direction as the rubbing direction of the upper orientation film 12 corresponding to a difference between the amount of the counterclockwise rotation and that of the clockwise rotation.

According to the object rotating mechanism in accordance with the first embodiment, therefore, if an object to be moved is mounted on the upper member 11, it can be rotated and moved together with the upper member 11 with respect to the lower member 11.

If a pulse-like voltage is intermittently applied between the electrodes E and E by the control device D, moreover, the upper member 11 can be rotated and moved intermittently with respect to the lower member P. In addition, if a time interval of the pulse-like voltage to be applied between the E and E, that is, a time interval at which the electric field is applied is changed, the amount of the rotation of the upper member 11 can be changed. If the time interval at which the electric field or the magnetic field is applied is shortened, furthermore, the upper member 11 can be rotated more continuously.

Next, description will be given to an object rotating mechanism according to a second embodiment.

The object rotating mechanism according to the second embodiment is obtained by the application of the object rotating mechanism according to the first embodiment, and a basic operation principle is the same. Therefore, the detailed description of the operation principle and repetitive structures will be omitted. The structure of the object rotating mechanism according to the second embodiment and functions and effects thereof will be described below.

Figure 6:
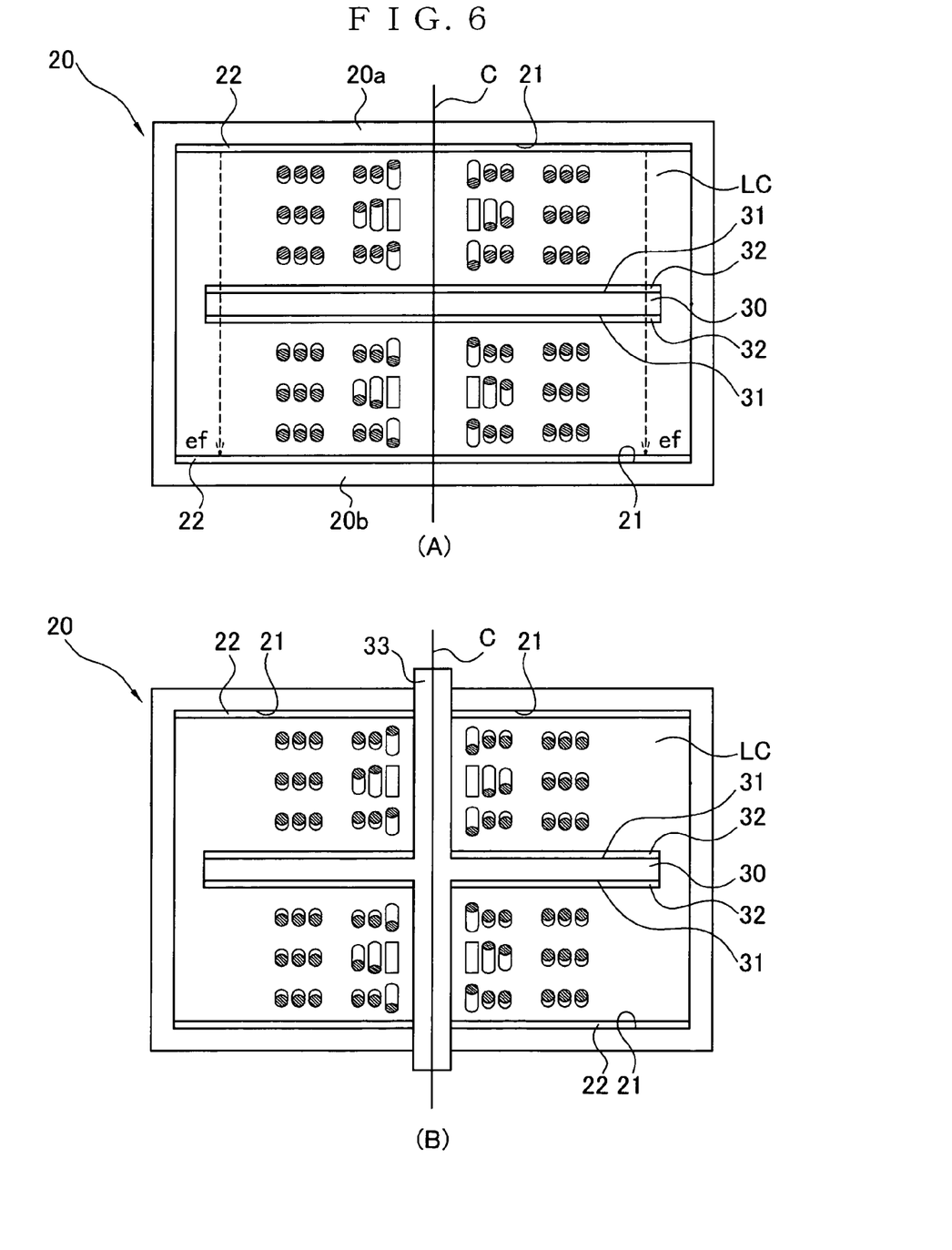
FIG. 6 is an explanatory view showing an object rotating mechanism according to a second embodiment.

FIG. 6 is an explanatory view showing the object rotating mechanism according to the second embodiment. In FIG. 6, the reference numeral 20 denotes a casing of the object rotating mechanism according to the second embodiment. The casing 20 comprises a pair of opposed surfaces 21 and 21 which are opposed to each other on the internal surfaces of an upper wall 20a and a lower wall 20b, and a liquid crystal LC is filled therein.

Orientation films 22 and 22 are provided on the opposed surfaces 21 and 21 of the casing 20 respectively, and the opposed surfaces of the orientation films 22 and 22 are subjected to a rubbing treatment in the same rotating direction around an identical crossing line C crossing the upper and lower internal surfaces 21 and 21 along a circle having a center on the crossing line C. More specifically, the rubbing treatment is clockwise carried out over both of the orientation films 22 and 22 as seen from above in the axial direction of the crossing line C.

Moreover, a moving member 30 is provided in the casing 20. The moving member has a pair of moving side opposed surfaces 31 and 31 which are opposed to the opposed surfaces 21 and 21 of the casing 20, and is provided movably with respect to the casing 20 in a state in which the moving side opposed surfaces 31 and 31 are opposed to the opposed surfaces 21 and 21.

The opposed surfaces 21 and 21 of the casing 20 are provided with moving side orientation films 32 and 32 respectively, and each moving side orientation film 32 is subjected to a rubbing treatment having the direction of a rotation around the crossing line C which is reverse to that in the rubbing treatment for the orientation film 22 opposed thereto. More specifically, the rubbing treatment is carried out counterclockwise as seen from above in the axial direction of the crossing line C.

Consequently, a liquid crystal molecule m provided between the upper opposed surface 21 and the moving side orientation film 32 opposed to the opposed surface 21 in the casing 20 is arranged in a state in which a counterclockwise downstream side is inclined upward as seen from above in the axial direction of the crossing line C with respect to the moving side orientation film 32 and in such a manner that the axial direction is turned in the direction of the tangent of a circle around the crossing line C.

On the other hand, the liquid crystal molecule m provided between the lower opposed surface 21 and the moving side orientation film 32 opposed to the opposed surface 21 in the casing 20 is arranged in a state in which a counterclockwise downstream side is inclined downward as seen from above in the axial direction of the crossing line C with respect to the moving side orientation film 32 and in such a manner that the axial direction is turned in the direction of the tangent of the circle around the crossing line C.

In other words, both the liquid crystal molecule m provided between the upper opposed surface 21 and the moving side orientation film 32 in the casing 20 and the liquid crystal molecule m provided between the lower opposed surface 21 and the moving side orientation film 32 in the casing 20 are arranged in the direction of the tangent of the circle around the crossing line C, while the liquid crystal molecule m placed in a corresponding position, that is, positioned on a parallel line with the crossing line C is oriented in such a manner that an inclination to the lower opposed surface 21 is reverse.

An electrode E (not shown) which is connected to a control device D (not shown) is provided between the opposed surface 21 and the orientation film 22 in the casing 20 and between the moving side opposed surface 31 and the moving side orientation film 32 in the moving member 30. When a voltage is applied to each electrode E by the control device D, therefore, an electric field ef can be formed between the opposed surface 22 and the moving side opposed surface 32. The electrode E represents an orienting device in claims, and a pair of orientation films 22 and 22, a pair of moving side orientation films 32 and 32, the electrode E and the control device D constitute liquid crystal molecule rotating means in claims.

In the object rotating mechanism according to the second embodiment, when a voltage is applied to the electrode E by the control device D in a state in which the casing 20 is fixed, the electric field ef is formed between the opposed surface 21 and the moving side opposed surface 32 and the liquid crystal molecule m provided between both of them is rotated around a center of gravity so that the flow of a liquid crystal is generated on the liquid crystal LC between the opposed surface 21 and the moving side opposed surface 32.

Consequently, the flow of the liquid crystal is generated with the crossing line C set to be a center in the same direction around the crossing line C, that is, counterclockwise as seen from above in the axial direction of the crossing line C between the upper opposed surface 22 and the moving side opposed surface 32 and between the lower opposed surface 22 and the moving side opposed surface 32. Consequently, the moving member 30 can be rotated counterclockwise as seen from above in the axial direction of the crossing line C.

A rotating mechanism in claims is constituted by the upper wall 20a and the lower wall 20b, the moving member 30 in the casing 20, and the liquid crystal molecule rotating means.

As shown in FIG. 6(B), moreover, the moving member 30 is provided with an output shaft 33 which is coaxial with the crossing axis C. If the tip portion of the output shaft 33 is protruded toward the outside of the casing 20 and is attached rotatably with respect to the casing 20, the output shaft 33 can be rotated around the axis together with the moving member 30 when the moving member 30 is rotated. Consequently, the energy of the rotating motion of the moving member 30 can be taken out as the rotating torque of the output shaft 33. Thus, it is possible to easily take out a kinetic energy generated from the rotating mechanism. More specifically, it is possible to employ a liquid crystal motor having the output shaft 33 to be a main shaft. Since such a liquid crystal motor can be driven by a slight power or the like, it is effective for a driving source of a micromachine, a power source such as a working machine to be attached to the micromachine or the like.

Figure 7:
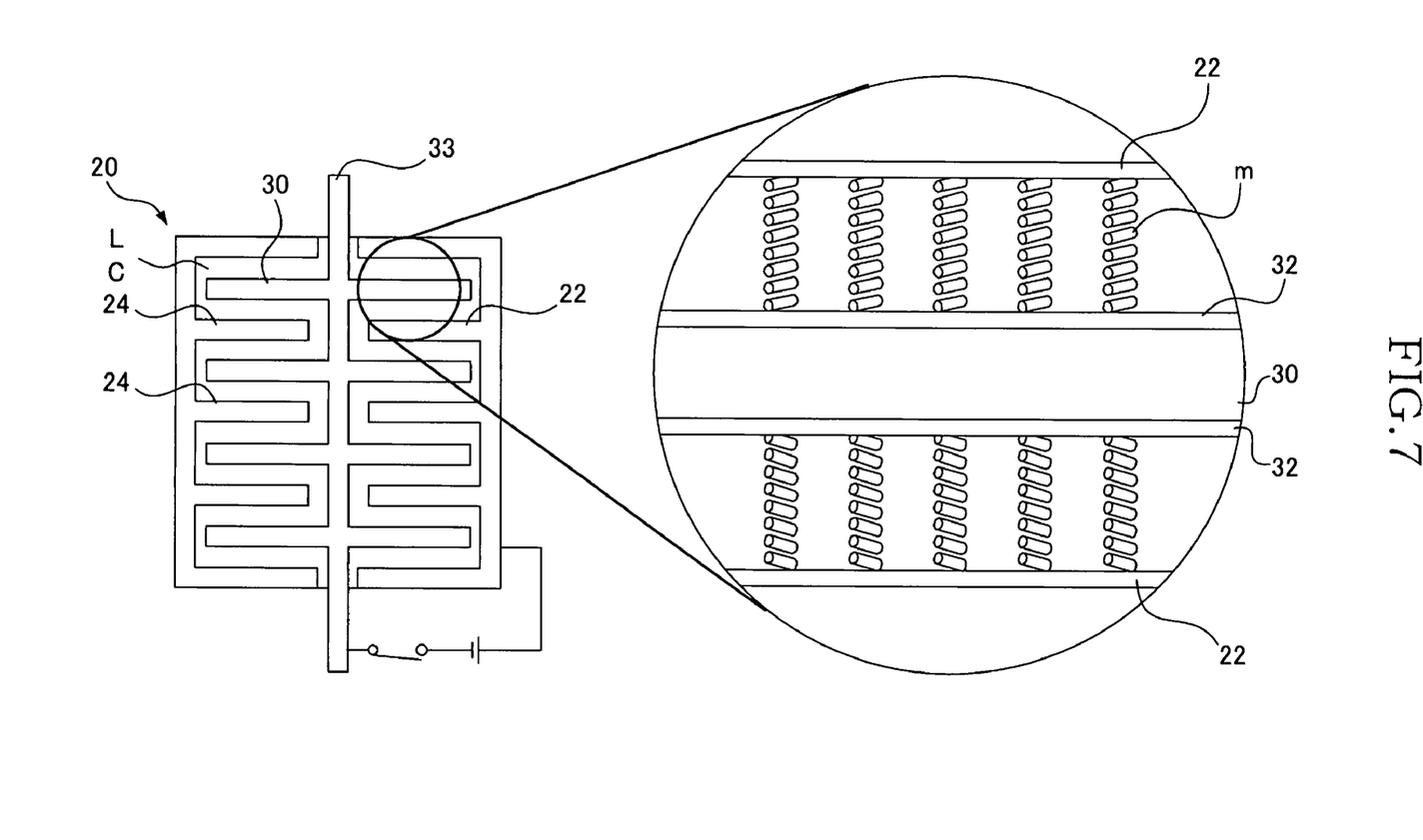
FIG. 7 is an explanatory view showing an object rotating mechanism comprising a rotating mechanism in a plurality of stages.

As shown in FIG. 7, plates 24 in a plurality of stages may be provided in the casing 20, the moving member 30 attached to the output shaft 33 may be disposed between a pair of adjacent plates 24 and 24, the orientation film 22 described above may be provided on the opposed surfaces to the adjacent plates 24 and 24, and the moving side orientation film 32 may be provided on the moving member 30. In other words, the rotating mechanism described above may be constituted by the adjacent plates 24 and 24 and the moving member 30 respectively. In this case, the kinetic energy generated from the moving members 30 in a plurality of rotating mechanisms can be taken out of one output shaft 30. Therefore, it is possible to increase the rotating torque generated on the output shaft 30.

In order to implement the object rotating mechanism utilizing the flow of a liquid crystal to be rotated around one shaft according to the present application, it is necessary to satisfy the continuity of the orientation of a liquid crystal molecule on the center of a rotation based on the theory described above. Therefore, it has been confirmed that the above-mentioned theory is right by a numerical calculation in the following manner.

At this time, the orientation angle of the liquid crystal molecule in each position between a pair of parallel disks subjected to a rubbing treatment around a central axis was calculated by using the Landau Dejean Theory. The calculation was carried out by using a finite difference method for the discretization of a space to be calculated. A C language and a calculator of EWS were used.

At the present time, in a calculation region, the radial direction of the disk was calculated to be five times as great as an interval between the disks, and a difference lattice at that time was set to be a tetragonal lattice (the number of lattices is 101×501) obtained by dividing the interval between the disks equally into 100 parts.

Figure 8:
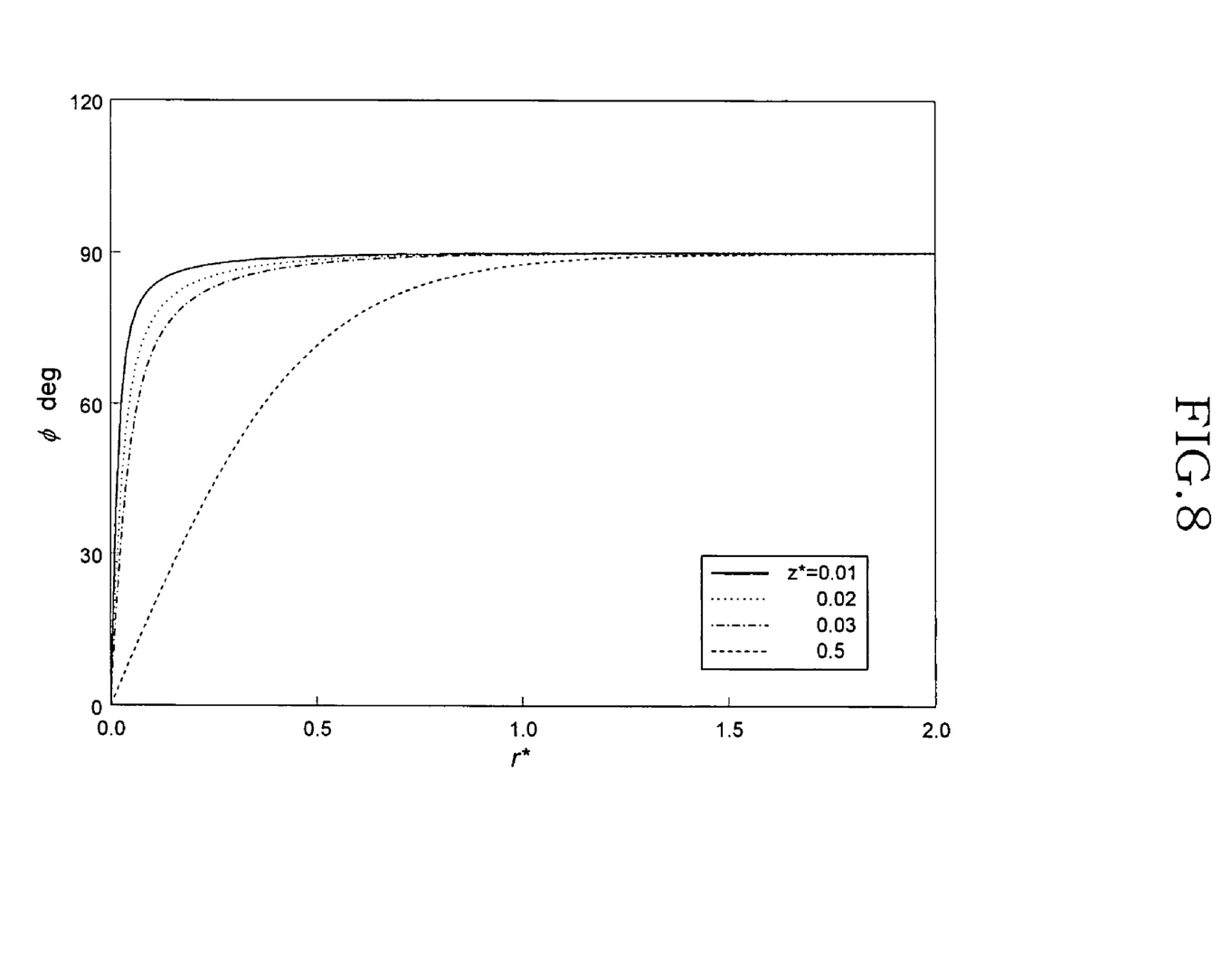
FIG. 8 is a chart showing a relationship between a tilt angle of a liquid crystal molecule and a distance from the center of a disk.

FIG. 8 is a chart showing a relationship between a tilt angle of a liquid crystal molecule and a distance from the central axis of a disk. In FIG. 8, an axis of abscissa $r^*$ indicates a dimensionless radial position obtained by dividing the distance from the central axis of the disk by the interval between the disks, an axis of ordinate $\phi$ indicates an orientation angle of the liquid crystal molecule which is measured in a perpendicular direction to the disk, $\phi=0$ deg represents a state in which the liquid crystal molecule is turned in the perpendicular direction to the disk, and $\phi=90$ deg represents a state in which the liquid crystal molecule is turned in a parallel direction with the disk. Moreover, a parameter $z^*$ represents a position in the perpendicular direction to the disk which is dimensionless at the interval between the disks, $z^*=0$ represents a surface of a lower disk, $z^*=0.5$ represents a center between two disks, and $z^*=1.0$ represents a surface of an upper disk.

As shown in FIG. 8, the liquid crystal molecule on the central axis of the disk has an orientation angle of $\phi=0$ deg. In other word, the liquid crystal molecule is not oriented in parallel with the disk but in the perpendicular direction thereto. Since the liquid crystal molecule is oriented in the perpendicular direction, it is possible to confirm specific respects, that is, the fact that the orientation can be prevented from being discontinuous on the central axis of the disk. Thus, it is possible to confirm that the above-mentioned theory is right.

It can be confirmed that the orientation angle $\phi$ of the liquid crystal molecule is smaller when the central axis of the disk is closer in order to set the orientation angle $\phi$ of the liquid crystal molecule on the central axis of the disk to be 0 deg. Also in a liquid crystal with $z^*=0.5$ which is the most distant from both of the disks in the perpendicular direction to the disk, the orientation angle $\phi$ is 90 deg with approximately $r^*=1$ (an interval between two disks). Consequently, it is possible to confirm that the influence of the orientation angle $\phi$ of 0 deg in the liquid crystal molecule on the central axis of the disk reaches approximately $r^*=1$ from the central axis of the disk (an interval between tow disks) in the radial direction of the disk. In other words, if the radius of the disk is greater than the interval between the disks, it is possible to confirm that the influence of a peculiarity in the vicinity of the central axis of the disk on the orientation of the liquid crystal molecule, that is, the influence on the flow of the liquid crystal is reduced.

From the results described above, a change in the orientation angle of the liquid crystal molecule disposed in the vicinity of the central axis of the disk can be almost disregarded as long as a disk having an extremely small diameter, that is, an almost equal radius to the interval between the disks is not used. Therefore, it is possible to confirm that a torque generated by the rotation of the disk can be calculated on the assumption that the behavior of the liquid crystal molecule does not depend on a radial position.

INDUSTRIAL APPLICABILITY

According to the present invention, an electrical energy can be utilized for the rotating movement of an object through the flow of a liquid crystal and can be converted into a kinetic energy which can be utilized industrially through the flow of the liquid crystal. Therefore, it is possible to manufacture a delivery mechanism and a turntable which serve to move a very small object or a minute motor.

The invention claimed is:

1. An object rotating mechanism using a flow of a liquid crystal, comprising a pair of members having opposed surfaces which are opposed to each other and provided to be relatively movable in a state in which the opposed surfaces are opposed to each other, a liquid crystal provided between the opposed surfaces of the members, and liquid crystal molecule rotating means for rotating a liquid crystal molecule of the liquid crystal in a crossing surface crossing one of the opposed surfaces, wherein the liquid crystal molecule rotating means includes a pair of orientation films formed on the opposed surfaces of the members respectively, and the orientation films are subjected to a rubbing treatment in which directions of a rotation around an identical crossing line crossing the members are reverse to each other along a circumference of a circle having a center on the crossing line.

2. An object rotating mechanism comprising a pair of members having opposed surfaces which are opposed to each other, a liquid crystal provided between the opposed surfaces of the members, liquid crystal molecule rotating means for rotating a liquid crystal molecule of the liquid crystal in a crossing surface crossing one of the opposed surfaces, and a moving member having a pair of moving side opposed surfaces which are opposed to the opposed surfaces of the members respectively and provided to be relatively movable with respect to the members in a state in which the moving side opposed surfaces are opposed to the opposed surfaces of the members, wherein the liquid crystal molecule rotating means includes a pair of orientation films formed on the opposed surfaces of the members respectively and a pair of moving side orientation films formed on the moving side opposed surfaces of the moving member respectively, the orientation films are subjected to a rubbing treatment in which directions of a rotation around an identical crossing line crossing the members and the moving member are the same along a circumference of a circle having a center on the crossing line, and the moving side orientation films are subjected to the rubbing treatment in which the direction of the rotation around the crossing line is reverse to the opposed orientation films along the circumference of the circle having the center on the crossing line.

3. The object rotating mechanism using a flow of a liquid crystal according to claim 2, wherein the rotating mechanism includes an output shaft which is coaxial with the crossing line.

4. The object rotating mechanism using a flow of a liquid crystal according to claim 2, wherein the rotating mechanism is provided in a plurality of stages, each of the rotating mechanism is provided in such a manner that a crossing line thereof is positioned on an identical line, and an output shaft to which the moving member of the rotating mechanism is attached is provided coaxially with the crossing line.

5. The object rotating mechanism using a flow of a liquid crystal according to claim 1 or 2, wherein the liquid crystal molecule rotating means is provided with an orienting device for applying an electric field or a magnetic field to the liquid crystal.

6. The object rotating mechanism using a flow of a liquid crystal according to claim 5, wherein the liquid crystal molecule rotating means which are opposed to each other include a control device for controlling a timing in which the orienting device applies an electric field or a magnetic field to the liquid crystal, and the control device intermittently applies the electric field or the magnetic field to the liquid crystal.

* * * * *